Figure 3:
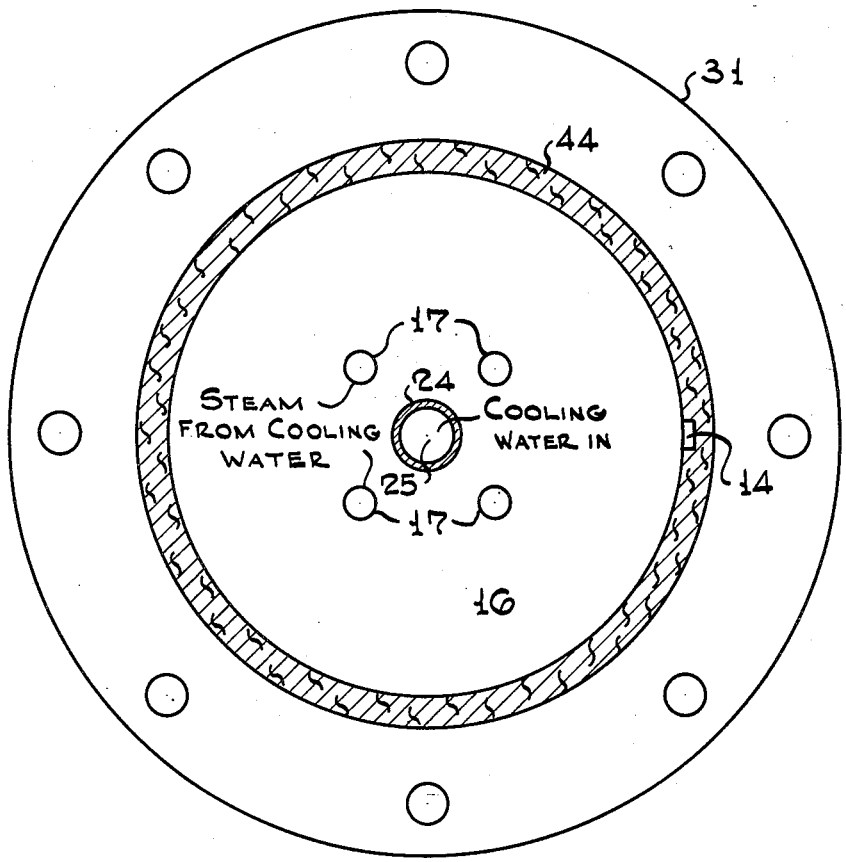

March 31, 1953 W. F. ROLLMAN 2,633,477
CATALYTIC METHOD AND APPARATUS
Filed Sept. 24, 1946 3 Sheets-Sheet 1
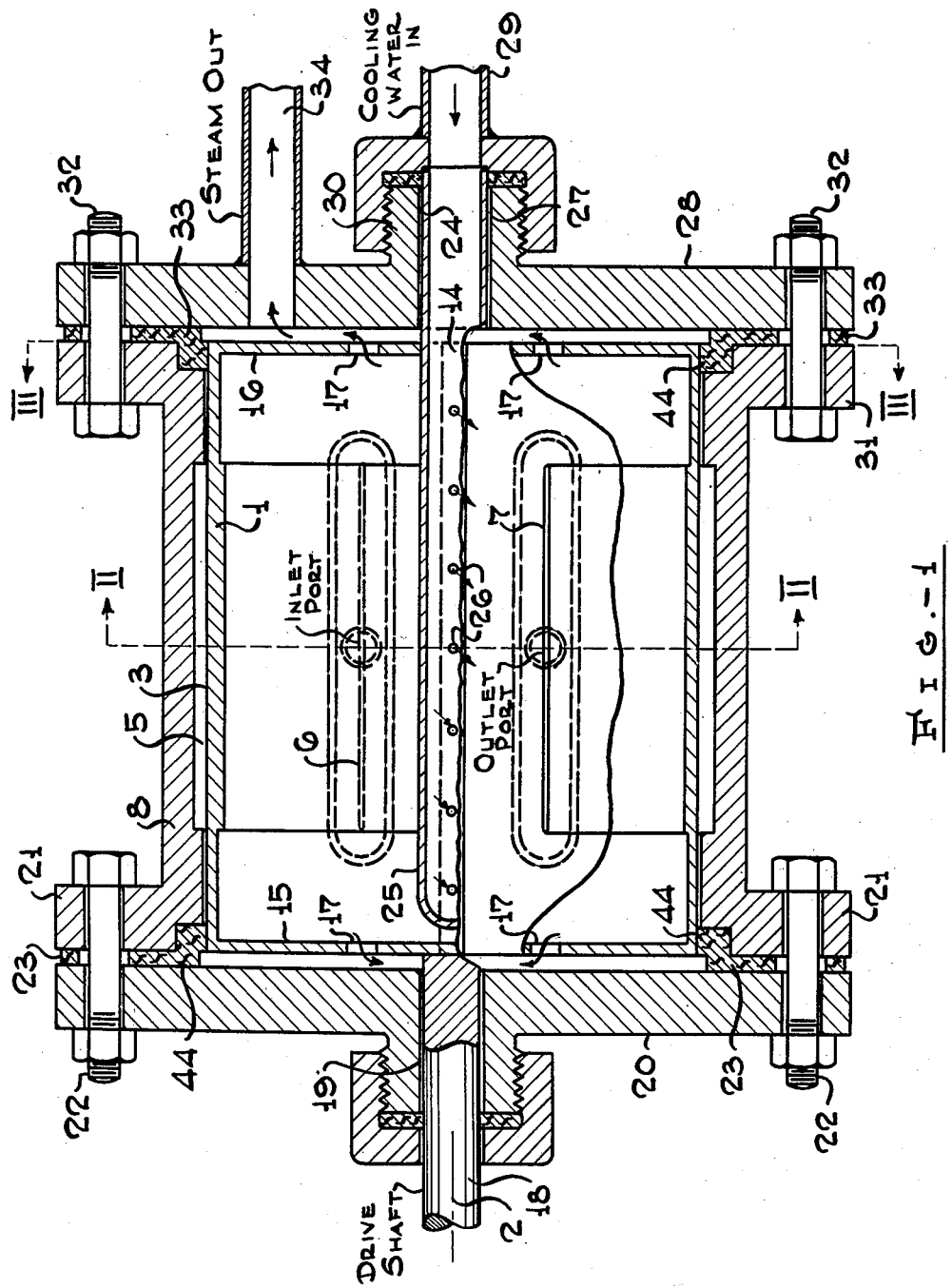
Walter F. Rollman Inventor
By J. K. Small Attorney

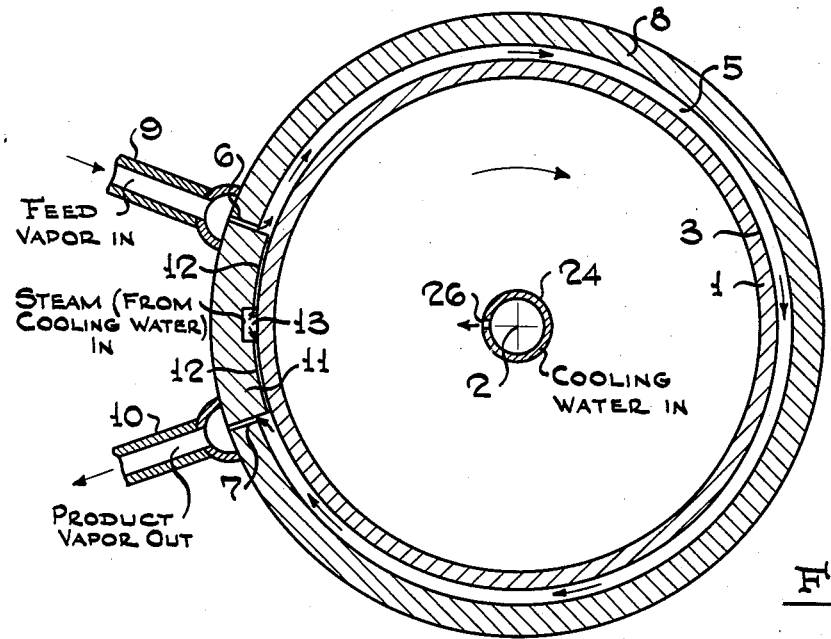
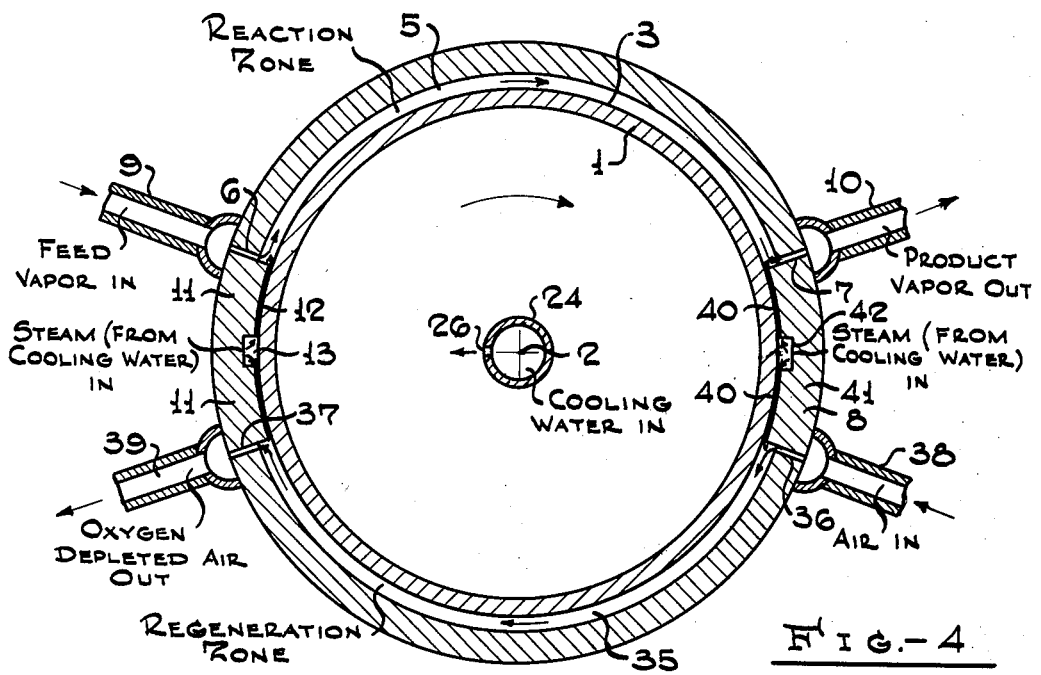

Patented Mar. 31, 1953

2,633,477

UNITED STATES PATENT OFFICE 2,633,477

CATALYTIC METHOD AND APPARATUS

Walter F. Rollman, Cranford, N. J., assignor to Standard Oil Development Company, a corporation of Delaware Application September 24, 1946, Serial No. 698,948

11 Claims. (Cl. 260—687)

This invention relates to a method and apparatus for accomplishing controlled reactions of reactant vapors contacted with a catalytic surface coating revolved about a central axis.

An object of this invention is to provide a method and apparatus particularly adapted for vapor phase reactions requiring a very short contact time and good control of temperature.

The method and apparatus are applicable to the partial oxidation of hydrocarbon vapors, for example, the conversion of naphthalene, o-xylene, or o-toluic acid, vapors to phthalic anhydride, the Fischer synthesis of hydrocarbons and oxygenated organic compounds from carbon monoxide and hydrogen, dehydrogenation of unsaturated hydrocarbons such as alkenes or arylalkanes and various other reactions.

In a preferred embodiment the apparatus comprises a hollow cylinder or a metallic drum coated on its outside with a catalyst and rotated by mechanical means about a central horizontal axis within a second fixed cylinder or housing. Means are provided for introducing reactant vapors, stripping gases, regenerating gases, and the like through the outer fixed cylinder into spaces between the fixed cylinder and the inner rotating one. These spaces are annular sectors of limited width, and the various vapor streams are made to follow a definite course by means of suitable baffles and sealing gases such as steam. The rotating cylinder carrying the catalyst coating on its outer surface is provided with means for supplying a heat exchange medium to its interior. The outer cylinder or housing is provided with outlets for fluid products.

Reaction is accomplished in the apparatus by passing reactant vapors from a feed entrance in the housing through a portion of the annulus between the outer surface of the rotating drum and the housing to a vapor product outlet in the housing. This portion of the annulus serves as a reaction zone. The reactant vapors and their products are prevented from flowing past the reaction zone into another sector of the annulus surrounding the rotating drum by having a smaller clearance between the rotating drum and the interior wall of the housing to serve as baffle sections in areas adjacent the reaction zone and furthermore by introducing a sealing gas into these baffle sections.

In exothermic reactions, the heat of reaction is removed by a cooling medium inside the drum, preferably through formation of steam produced from water sprayed on the inside surface of the drum. The rotating motion of the drum aids in preventing hot spot formation, thus insuring uniformity of temperature in the reaction zone.

The principles involved in the operation of the apparatus have been proved to be important in the satisfactory control of reactions requiring close control of reaction conditions and contact time. For example, it has been shown that in order to obtain maximum yields of phthalic anhydride by partial oxidation of suitable aromatic hydrocarbon vapors, such as vapors of naphthalene, ortho-xylene, or o-toluic acid, a close, uniform control of the reaction temperature is required with short contact times, such as a few hundredths of a second, and a very limited catalyst area is sufficient. The revolving catalyst surface technique is considered the best devised for precision control of contact time with uniform reaction temperature and, moreover, for rapid and complete separation of reaction products from the catalyst with a minimum loss of time and energy in bringing back the catalyst into the reaction zone. Likewise, no excess catalyst beyond that actually necessary for the reaction is required.

The form and construction of a rotating drum reactor suitable for application of the technique to the oxidation of naphthalene vapor to phthalic anhydride is indicated in the accompanying drawing. In the drawing:

Figure 1 shows diagrammatically a vertical cross-section of the rotating drum reactor; Figure 2 shows a cross-section of the reactor taken at II—II; Figure 3 shows a cross-section of the reactor taken at III—III through Figure 1; Figure 4 shows a central vertical cross-section perpendicular to the horizontal axis similar to Figure 2 but with the reactor modified to provide a regeneration zone in the annulus between the housing and the rotating drum opposite the reaction zone. Figs. 2 and 4 are on a reduced scale.

With reference to the drawings, as already mentioned the reactor comprises a hollow metallic drum 1 rotated by conventional mechanical means, not shown, about its central longitudinal axis 2. The external surface 3 of drum 1 is coated with the catalytic agent, e. g., vanadium oxide in the production of phthalic anhydride. It is feasible to prepare vanadium oxide coatings on various metallic or refractory surfaces and these coatings can be made quite uniform, thin and tenacious. It has likewise been shown that the activity of these coatings in vapor phase partial oxidation reaction is equivalent to that of conventional partial oxidation catalysts employed in a fixed bed or with a fluid catalyst technique.

The drum 1 holds the thin catalytic surface coating around its outer periphery in the form of a middle section band corresponding approximately in width to the width of a groove 5 in the concave inner surface of the housing. Groove 5 is the annular sector which serves as the reaction zone, wherein reactant vapors from a feed inlet port 6 flow and contact with the revolving catalytic surface until they reach the outlet port 7. The reactant vapors form a thin, broad stream which intimately contacts with the arc of revolving catalytic surface of drum 1 in the reaction zone.

Both the inlet port 6 and outlet port 7 in the housing 8 are in the form of slots coextensive with the width of groove 5 and are located at the opposite circumferential ends of groove 5. Feed inlet pipe 9 is fastened or sealed to the housing 8 over an opening to the inlet port slot 6 for passage of reactant vapor thereto. Similarly, product outlet pipe 10 is fastened or sealed to housing 8 over an opening to the outlet port 7 for withdrawal of the vapor product from the reaction zone.

Between the inlet and outlet ends of the reaction zone Fig. 2 which occupies the space in groove 5, the housing wall projects lengthwise closer to the outer surface of the revolving drum, thereby forming a baffle 11 with a minimum clearance 12 between its inner concave surface and the outer surface of the revolving drum passing adjacent thereto. There is only a slight tendency for vapor to pass from the reaction zone groove 5 through the small space of this minimum clearance. A relatively narrow milled slot 13 in the concave surface of the baffle 11 serves as a passage for steam or sealing gas which tends to force its way into the minimum clearance space and thus substantially prevent any flow of reactant vapor or vapor product through this space. The groove 13 extends laterally in the baffle projection of housing 8 and is coextensive with the length of the rotating drum 1. This groove has an inlet 14 for the steam or sealing gas at the end of the drum.

The disk-shaped ends 15 and 16 of the drum 1 have perforations 17 which act as fluid outlets and the drum end 15 is centrally attached to a drive shaft 18 which is concentric to the horizontal axis of the rotating drum. The drive shaft 18 is revolved within a journal opening 19 in the end 20 of housing 8 and a suitable stuffing box arrangement, not shown in detail, is provided for preventing escape of fluid from the interior of the housing through the journal. The disk-shaped end 20 is secured to flanges 21 of housing 8 by bolts 22 and an intervening packing 23 serves to prevent escape of fluid between the enclosure of 20 and the housing body 8.

The perforated disk end 16 of revolving drum 1 is centrally fastened to a tube 24 which is closed at its innermost end 25 and has laterally spaced small outlet holes 26 for emitting and distributing a heat exchange medium (which is cooling water) to the inside surfaces of the drum. The tube 24 projects outwardly from the rotating drum 1 into a journal 27, which is centrally located in the disk-shaped enclosure 28 for the housing body 8. This outward projection of tube 24 serves as a shaft opposite the drive shaft and is open to inflow of heat exchange medium or cooling water from pipe 29 which is coaxially attached to the hub-shaped portion 30 of disk 28. The hub-shaped portion 30 which provides the journal 27 for the bearing of tube 24 is provided with a stuffing box arrangement, not shown in detail, to prevent escape of fluid from the interior of the housing 8. The disk 28 is secured to flange ends 31 of housing 8 by bolts 32 which compress the intervening packing 33 against the flange 31 for preventing escape of fluid. A packing ring 44 around each end of the drum prevents leakage of vapors between the reaction zone and the end of the drum.

During operation a heat exchange medium, such as cooling water, flows into tube 24 from pipe inlet 29 and is sprayed through holes 26 in tube 24 against the interior wall surfaces of the rotating drum. It is in order for water to be employed directly as the cooling medium and the quantity of water supplied will be a function of the drum temperature and pressure maintained within the drum as well as evolved heat of reaction. Steam formed in the revolving drum 1 flows out through perforations 17 at the ends of the drum and is withdrawn under controlled pressure through the steam outlet pipe 34 attached to the housing end 28. A portion of the steam which leaves the interior of the revolving drum 1 flows into a milled slot 13 indicated in Figure 3 to act as sealing gas at the surface of the baffle 11. The direction and velocity of the rotating drum can be set with respect to the flow rate of the reactant vapors entering the reaction zone 5 from the inlet port 6 to obtain the desired reaction contact time as the vapor flows through the reaction zone 5 to the outlet port 7. Considering that the drum is rotated in a clockwise direction as indicated in Figure 2, when the catalytic surface of the drum passes the outlet port 7 and enters the annular space of minimum clearance adjacent the baffle 11, it carries along a negligible amount of vapor product and is, furthermore, stripped of vapor product by steam or sealing gas which tends to be forced in a counterclockwise direction toward the outlet port 7. A portion of the sealing gas travels through the minimum clearance in a clockwise direction toward the inlet port 6 and prevents the incoming reactant vapors from entering the minimum clearance space.

In Figures 1, 2, and 3, the total annular space encompassing the revolving drum 1 is divided into two sections, namely, the reaction zone 5 and the sealing zone in the minimum clearance space 12. This type of construction is suitable in a process which does not require regeneration of the catalyst coating in a zone separate from the reaction zone. For instance, in the production of phthalic anhydride from a suitable aromatic hydrocarbon the reactant vapor enters the reaction zone 5 from inlet port 6 with admixed oxygen-containing gas in proper proportions for the partial oxidation and the vapor product leaves the reaction zone 5 through the outlet port 7 with excess oxygen. The revolving catalyst surface moving away from the reaction zone is then immediately stripped of any adsorbed vapor product by the flow of sealing gas in contact with the surface.

Since the revolving motion of the drum in conjunction with an efficient cooling means minimizes hot spot formation, and since the catalyst can be very quickly transferred from one phase of operation to another in the revolving drum apparatus, the catalyst may be used as an oxygen carrier with precision control of the reaction together with the advantage of avoiding dilution of the reactant vapor with oxidizing reagent.

Figure 4 illustrates a simple modification of the apparatus for an operation wherein the catalyst is used as an oxygen carrier. In this modification the annulus around the entire circumference of the drum is divided into four sections, namely, the reaction zone 5, an opposite regeneration zone 35, and two sealing sections between the ends of the reaction zone in the regeneration zone. Like the reaction zone 5, the regeneration zone 35 is the space in a groove or recess within the inner wall of the housing 8. The regeneration zone 35 has the same breadth as the reaction zone 5. It begins at an inlet port 36 for regenerating gas, such as air, and terminates at an outlet port 37 where regeneration gas is vented from the housing. The ports 36 and 37, like the ports 6 and 7 are in the form of narrow slots coextensive with the width of the zone for prompt distribution and removal of the regeneration gas. The slots 36 and 37 have a central opening to the exterior wall of the housing 8 and communicate with inlet and outlet lines 38 and 39, respectively, which are sealed to the housing 8. With the modified form of housing as shown in Figure 4, the reactant vapor enters the reaction zone 5 from inlet port 6 to contact with the revolving surface as it passes zone 5. The vapor product leaves the reaction zone 5 through outlet port 7 and the revolving catalyst surface moves from the reaction zone into a minimum clearance space 40 between the baffle 41 and the catalyst surface of the rotating drum 1. A sealing gas, such as steam, is forced clockwise and counter-clockwise through the minimum clearance space from the milled slot 42 which, like the already-explained groove 13, is a communicating passage for a part of the steam formed from the cooling water inside the revolving drum. When the revolving catalyst surface enters the regeneration zone 35 it is contacted with regeneration air entering from inlet port 36. On passing from the regeneration zone 35 into the minimum clearance space 12 the oxidized or regenerated catalyst surface is contacted with the sealing gas or steam entering from slot 13. Thereafter, the regenerated catalyst surface revolves into reaction zone 5 to begin a new cycle.

A number of advantages of operation with the revolving catalyst surface as compared to conventional methods of operation, and the manner in which observed experimental data apply to the operation, will be apparent from the following discussion of operations in which a regeneration zone is omitted and in which the regeneration zone is used. In carrying out the partial oxidation of naphthalene vapor to phthalic anhydride with admixed air using an apparatus illustrated in Figures 1, 2, and 3, a mixture of 2 mole per cent naphthalene vapor in air is admitted to the reaction zone and no regeneration zone is required. Conventional fixed bed practice is limited to a feed concentration of about 0.8 mole per cent of naphthalene vapor in air and the higher concentration of the reactant vapor in air utilizable with the revolving catalyst surface technique reduces the cost of the process materially. This reduction in cost is indicated by the fact that the air demand and fixed gas production are lowered in using a higher feed concentration and improved control of reaction conditions.

With a catalyst-coated drum 10 ft. long and 3 ft. in diameter revolving at a speed of 120 R. P. M. and with a reaction space $\frac{1}{8}$ in. wide in the annulus between the drum and the jacket, the reactant vapor feed can be supplied at a rate equivalent to a contact time of $\frac{2}{100}$ of a second and give such a reactor a capacity of about 15 tons per day of phthalic anhydride at 90% selectivity. Since conditions in the reaction zone are quite uniform, a 90% selectivity is readily obtainable. The removal of heat from the drum is no limitation and since the heat is removed at a high level it may be obtained directly in the form of high pressure steam if desired.

When the catalyst on the surface of the drum is employed as an oxygen carrier for the process, no molecular oxygen is required in the reaction zone, and the oxygen is supplied to the carrier in the regeneration zone. For instance, naphthalene vapor is introduced into the reaction zone of the annulus and reacts therein with oxygen contained in the vanadium oxide on the revolving surface of the rotating drum. The vanadium oxide thus reduced is reoxidized with air in the separate regeneration section of the annulus. An advantage of this technique resides in the reduction of the fixed gas that must be handled in a recovery system. For a drum rotating at a speed of 285 R. P. M., it is indicated that a vanadium oxide coating thickness of less than 0.02 mm. is sufficient to supply sufficient oxygen for the transfer of oxygen from the catalyst to the naphthalene vapor.

In the following table are summarized recommended conditions for partial oxidation of naphthalene using the revolving catalyst surface technique, first with the reactant naphthalene vapor in admixture with air (A) and secondly, with no admixture of air in the reaction zone but regeneration of the catalyst by air in a regeneration zone (B). In the third column of the table data are listed with regard to a conventional fixed bed operation for comparison.

*Method of partially oxidizing hydrocarbons*

[Production of phthalic anhydride.]

| | A | B | C |
|---|---|---|---|
| Case Operation Catalyst | Rotating Drum—Vanadium Oxide on Metallic Surface | | Conv. Fixed Bed—Vanadium Oxide on Corundum |
| Coolant | Water | | Salt or Mercury |
| Catalytic Surface Exposed to Air and Hydrocarbon | Simultaneously | Alternately | Simultaneously |
| Naphthtalene in Air, mole Percent | 2 | 100 | 0.8 |
| Air Demand, cu. ft./lb. feed | 145 | 145 | 368 |
| Selectivity to P. A., Percent | 90 | 90 | 76 |
| Fixed Gas Produced, cu. ft./lb. P. A | 130 | 7 | 410 |
| Capacity of Unit, tons P. A./Day | 15 | 15 | 11. Maximum |
| Length of Drum, ft | 10 | 10 | |
| Diameter of Drum, ft | 3 | 3 | |
| Speed of Drum, R. P. M | 120 | 285 | |

Method of partially oxidizing hydrocarbons—Continued

[Production of phthalic anhydride.]

|  | A | B | C |
|---|---|---|---|
| Case Operation Catalyst | Rotating Drum—Vanadium Oxide on Metallic Surface | | Conv. Fixed Bed—Vanadium Oxide on Corundum |
| Coolant | Water | | Salt or Mercury |
| Annulus Drum to Jacket, in | ⅛ | ⅛ | |
| Arc of Drum in Reaction Zone, in | 100. | 20. | |
| Arc of Drum in Regeneration Zone, in | | 90. | |
| Contact Time of Vapors in Reaction Zone, sec | 0.02 | 0.04 | |
| Contact Time of Drum in Reaction Zone, sec | 0.44 | 0.04 | |
| Contact Time of Drum in Regeneration Zone, sec | | 0.17 | |
| Catalyst Surface Loading, lbs. naph./sq. ft./hr | 13.3 | 13.3 | |
| Catalyst Temperature, °F | 1,050. | 1,050. | |
| Heat Absorbed by Coolant, B. t. u./sq. ft./hr. (Assumed fraction of drum surface effective for cooling) | 3,750. ¼ | 5,630. ¼ | |
| Pressure in Reaction Zone, p. s. i. g | 30. | 30. | |
| Required Thickness Effective V. Oxide Film, mm | | 0.019 | |

For other types of reactions, as, for example, hydrocarbon synthesis by reaction of carbon monoxide with hydrogen, dehydrogenation of butenes to butadiene, dehydrogenation of ethylbenzene to vinyl benzene, the catalyst coatings on the rotating drum are to contain suitable catalytic ingredients specific to these reactions, as, for example, iron oxide and suitable stabilizers and promoters, such as alumina and potassium oxide. These reactions are also accomplished with a very short contact time and in reaction such as the synthesis of hydrocarbons the catalyst is quickly regenerated in a separate regeneration zone. In the hydrocarbon dehydrogenation reactions the reactant vapors are admixed with steam on entering the reaction zone and do not require regeneration of the catalyst.

Numerous modifications and other applications of the described method and apparatus suggest themselves. For example, the length of the drum and the dimensions of the catalyst bed for a given capacity may be changed. The drum may be changed in form to a series of coaxial and hollow disks with catalyst on the outer surfaces of the disks. The technique may also be adapted to endothermic reactions by supplying a heating medium to the internal surface of the revolving drum instead of a cooling medium. The revolving drum surface technique in effect gives results comparable to the results obtainable with the most advanced moving fluid catalyst technique but without problems incidental to the fluid catalyst technique such as catalyst attrition and difficulties of control.

I claim:

1. A method of accomplishing a catalytic reaction of a reactant vapor, which comprises rotating a cylindrical catalyst coating about a central axis, contacting the breadth of a uniformly thin, broad stream of reactant vapor flowing through a reaction zone of uniform cross-section with an outer surface of said coating passing by said zone to accomplish the reaction with non-turbulent flow, stripping reaction product vapor from a portion of the coating revolved past the reaction zone by contact with a stripping gas that acts as a gas seal for the reaction zone, and supplying a fluid to a zone surrounded by the cylindrical catalyst coating for indirect heat exchange between said fluid and the coating.

2. A method of carrying out a catalytic reaction of a reactant vapor, which comprises rotating a cylindrical catalyst coating about its central longitudinal axis, flowing a uniformly thin, broad stream of reactant vapor through a reaction zone sector of an annulus space surrounding the cylindrical catalyst coating, the breadth of the vapor stream being that of the catalyst coating, to accomplish the reaction with non-turbulent flow passing a sealing gas into a stripping sector of the annulus space adjacent the reaction zone sector, and passing a regenerating gas into a regeneration sector of the annulus space, said regeneration sector being separated from the reaction sector by said stripping sector.

3. The method of effecting controlled contact of a gaseous reactant with a revolving catalyst surface of cylindrical contour, which comprises spreading the gaseous reactant into a thin, broad stream as it is introduced into a reaction zone between said cylindrical catalyst surface and a concave cylindrical surface spaced therefrom, maintaining said gaseous stream uniformly thin in its dimension between the catalyst surface and said concave surface while a broad side of said stream is contacted with the catalyst surface moving along with the stream, and withdrawing the resulting product stream of the gaseous reactant as a thin, broad stream where contact of the stream with the cylindrical catalyst surface is terminated.

4. The method of catalytically reacting a compound in vapor phase for a controlled short contact period, which comprises passing vapor of a reactant compound into an annular reaction zone, flowing said vapor in a continuous stream through said reaction zone to accomplish the reaction with non-turbulent flow, contacting the vapor in the reaction zone with a revolving catalyst coating of cylindrical contour for a controlled short period, stripping vapor from said catalyst coating as it moves from the reaction zone to a gas sealing zone, said sealing zone being a narrow uniform clearance between the revolving cylindrical catalyst coating and an adjacent stationary wall surface concave with respect to the coating to prevent passage of gas from the reaction zone, and revolving the stripped catalyst coating into contact with the stream of reactant vapor flowing through the reaction zone.

5. The method of catalytically reacting a vapor reactant for a controlled short contact period, which comprises flowing the reactant vapor in a continuous non-turbulent stream through an annular reaction zone of uniform cross-sectional area between the revolving cylindrical catalyst surface and a stationary surface spaced therefrom and concave thereto, contacting the vapor stream flowing in the reaction zone with the revolving catalyst coating for a controlled short period, stripping vapor from the coating as it passes from the reaction zone to a gas sealing zone where the cylindrical catalyst coating has a narrow clearance from an adjacent stationary surface concave surface to prevent vapor flow from the reaction zone to the sealing zone, passing an inert gas into said gas sealing zone, cooling the cylindrical coating by conducting heat therefrom through a hollow cylindrical base supporting the coating to a cooling medium inside the hollow cylindrical base, and revolving the stripped, cooled coating into contact with a reactant vapor stream passing through the reaction zone.

6. The method of catalytically reacting a reactant vapor, which comprises flowing a continuous non-turbulent stream of the reactant vapor through a reaction zone between a revolving cylindrical catalyst surface and a stationary cylindrical surface concave thereto, contacting the reactant vapor in said reaction zone with the revolving catalyst surface, steam stripping vapor products from the catalyst surface as it revolves past the reaction zone to a gas-sealing zone in a uniform narrow clearance between the catalyst surface and a stationary surface, passing steam into said sealing zone under pressure to act as a sealing gas and serve in stripping vapor from the catalyst surface moving into the sealing zone, regenerating the catalyst surface by contact with oxygen as it revolves from the gas sealing zone into a regeneration zone supplied with oxygen, cooling the revolving catalyst surface by conducting heat therefrom through a hollow cylindrical base supporting the catalyst to water sprayed within said hollow base, and revolving the catalyst surface from the regeneration zone through another gas sealing zone into contact with a stream of reactant vapor flowing through said reaction zone.

7. The method of partially oxidizing an organic reactant vapor, which comprises contacting a uniformly thin, broad, non-turbulent stream of the reactant vapor with an outer surface of a revolving catalyst coating of cylindrical contour supported on a revolving cylindrical base during part of its cycle of revolution, stripping reaction vapor products from the revolving catalyst coating as it moves out of contact with said feed stream of reactant vapor by revolving into a gas-sealing zone through which the reactant vapors and its products are barred from passing, spraying cooling water into the revolving hollow base member to remove heat from the catalyst coating, and withdrawing steam evolved from the cooling water in the interior of said rotating cylinder base.

8. An apparatus for catalytic vapor phase reactions, comprising a housing, a hollow cylindrical member rotatably mounted in the housing, an exterior catalytic surface of cylindrical contour on said hollow member spaced from interior walls of the housing, a fluid inlet passage through the housing for introducing reactant vapor into a reaction zone space of uniform cross-section between the catalytic surface and an interior wall of the housing, a fluid outlet passage through the housing for removing reaction vapor products from said reaction zone space, a baffle projecting inwardly from the housing to form a small clearance space with the catalytic surface as it passes under the baffle to block reaction vapor products from flowing past the reaction zone in contact with the catalytic surface, and a gas inlet passage through the baffle for introducing a sealing gas into said small clearance space.

9. An apparatus for catalytic vapor phase reactions, comprising a housing having interior wall of cylindrical contour, a drum rotatably mounted in the housing, an exterior cylindrical catalytic surface coating on said drum separated from the interior wall of the housing by an annular space, said annular space being a reaction zone of uniform cross-section over a substantial arc of the cylindrical coating, a fluid inlet slot in the housing for flowing reactant vapor as a thin, broad stream through the reaction zone at one end of said arc, a fluid outlet slot in the housing near the other end of said arc, a baffle projecting inwardly from the housing at the other end of said arc with a small clearance space from the cylindrical coating a slot in the baffle for passing a thin, broad stream of ribbon-like form of sealing gas into said small clearance space laterally to the cylindrical coating, means for introducing a cooling fluid into the interior of the drum, and a gas flow passage from the interior of the drum to the slot in the baffle, the breadth of said streams of reactant vapor and sealing gas being coextensive with the lateral width of the catalyst coating.

10. An apparatus for catalytic vapor phase reactions comprising a housing having interior walls of cylindrical contour, a drum rotatably mounted in the housing, an exterior cylindrical catalytic surface coating on said drum separated from concentric cylindrical interior walls of the housing by annular space sectors, one of these sectors being a reaction zone of uniform cross-section over a substantial arc of the coating, another of the sectors being a regeneration zone, each zone having a fluid inlet and fluid outlet passage at each arc end through the housing radial baffles projecting inwardly from the housing between the arc ends of the zones to small clearance spaces from the coating, a passage for sealing gas in the baffles to said small clearance spaces, a hollow shaft on which the drum is mounted coaxially with its longitudinal axis, a bearing in the housing for supporting the shaft, means for passing a fluid into said hollow shaft and spaced perforations in the hollow shaft for distributing fluid therefrom to the interior of the drum.

11. An apparatus for accomplishing catalytic vapor phase reactions, comprising a housing, a rotatable hollow member rotatably mounted on a shaft in said housing, an exterior catalytic surface of cylindrical contour on said hollow member spaced from interior walls of the housing, a fluid inlet passage for introducing a reactant vapor through the housing into a reaction zone space of uniform cross-section between the catalytic surface and an interior wall of the housing, an outlet passage for reaction vapor products through the housing from said reaction zone space, a baffle projecting from the housing to a small clearance with the catalytic surface of the rotating member to block reaction vapor products from circulating past the reaction zone space, and a sealing gas inlet through the baffle into said small clearance space.

WALTER F. ROLLMAN.

REFERENCES CITED

The following references are of record in the file of this patent:

UNITED STATES PATENTS

| Number | Name | Date |
|---|---|---|
| 1,678,778 | Harter | July 31, 1928 |
| 1,724,982 | Trumble | Aug. 20, 1929 |
| 2,081,272 | Foster | May 25, 1937 |
| 2,120,538 | Andrews | June 14, 1938 |
| 2,180,353 | Foster | Nov. 21, 1939 |
| 2,275,920 | Pelzer et al. | Mar. 10, 1942 |
| 2,373,008 | Becker | Apr. 3, 1945 |

FOREIGN PATENTS

| Number | Country | Date |
|---|---|---|
| 532,481 | Great Britain | Jan. 24, 1941 |